Feb. 14, 1939.  C. F. WAGNER ET AL  2,147,474
CONVERTING APPARATUS
Filed Sept. 10, 1937   3 Sheets-Sheet 1
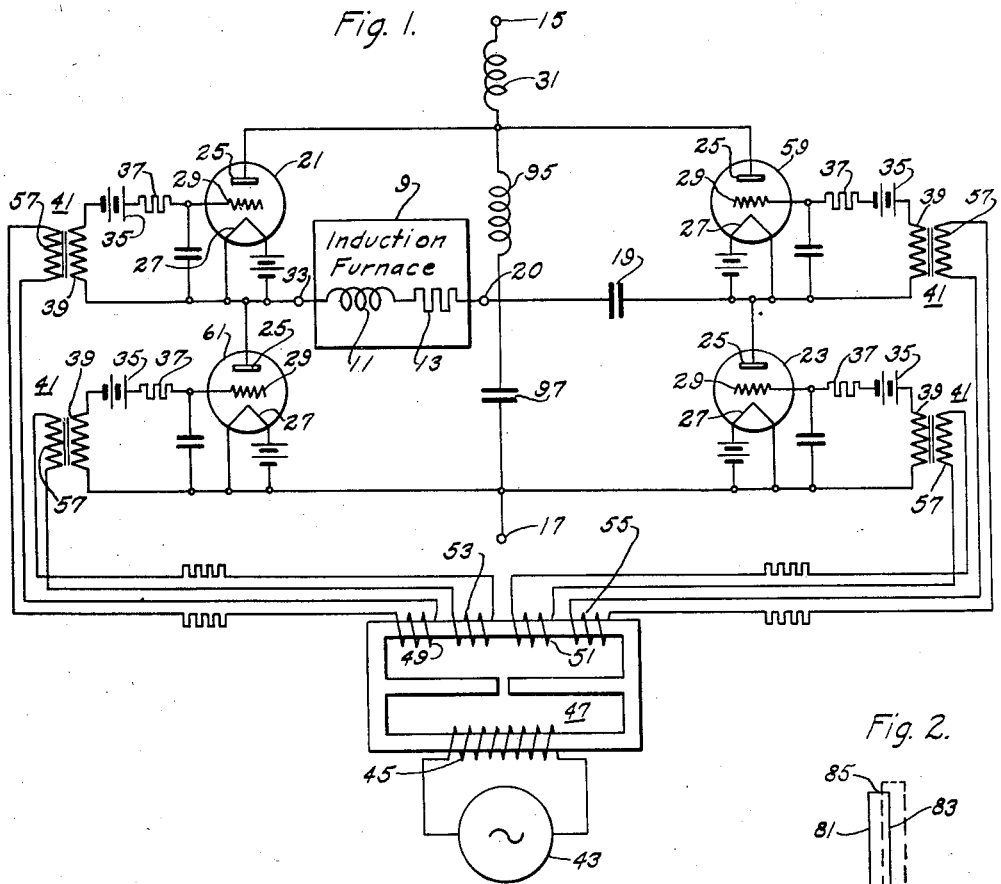
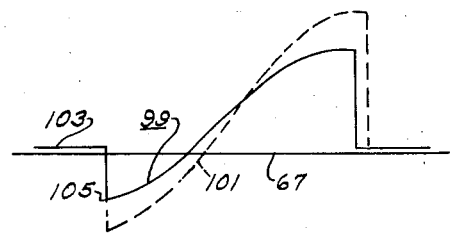
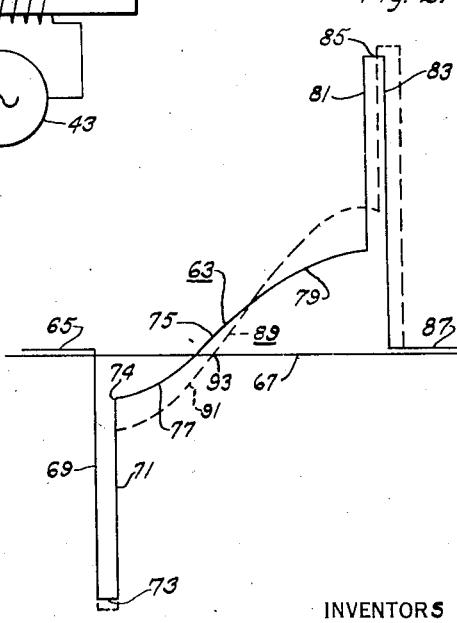
WITNESSES:
Leon M. Garman
Hymen Diamond
INVENTORS
Charles F. Wagner, Joseph Slepian
and Leon R. Ludwig.
BY
F. W. Lyle.
ATTORNEY Feb. 14, 1939. C. F. WAGNER ET AL 2,147,474
CONVERTING APPARATUS
Filed Sept. 10, 1937 3 Sheets-Sheet 2

WITNESSES:
Leon M. Garman
Hymen Diamond

INVENTORS
Charles F. Wagner, Joseph Slepian
and Leon R. Ludwig.
BY F.W.Lyle
ATTORNEY Feb. 14, 1939. C. F. WAGNER ET AL 2,147,474
CONVERTING APPARATUS
Filed Sept. 10, 1937 3 Sheets-Sheet 3

WITNESSES:
Leon M. Garman
Hyman Diamond

INVENTORS
Charles F. Wagner, Joseph Slepian
and Leon R. Ludwig.
BY
F. W. Lyle.
ATTORNEY Patented Feb. 14, 1939

2,147,474

UNITED STATES PATENT OFFICE 2,147,474

CONVERTING APPARATUS

Charles F. Wagner, Swissvale, Joseph Slepian, Pittsburgh, and Leon R. Ludwig, Forest Hills, Pa., assignors to Westinghouse Electric & Manufacturing Company, East Pittsburgh, Pa., a corporation of Pennsylvania Application September 10, 1937, Serial No. 163,208

29 Claims. (Cl. 172—281)

Our invention relates to converting apparatus and it has particular relation to apparatus of the type particularly adapted to supply a highly inductive load, such as a high-frequency heater.

Induction heaters operate satisfactorily when supplied with current having a frequency of the order of from 500 to 1000 cycles. The power available in the usual commercial supply lines is either of the direct current type or of a relatively low frequency such as 25 or 60 cycles and the practice in accordance with the teachings of the prior art, of which we are aware, has been to supply the power to the induction apparatus from the available source through a mechanical converter such as a motor generator set for example. Inasmuch as the power required is of considerable magnitude and the induction of the load is relatively high, the motor generator converter has not proved altogether satisfactory in the past, both by reason of the expense which it involves and also because of the auxiliary apparatus required to compensate for the poor power factor.

To avoid the difficulties involved in the use of the motor-generator set, the suggestion has been made that a converter incorporating electric discharge apparatus be utilized. The present invention is the outgrowth of an extensive investigation carried out by us to provide a converting system incorporating discharge apparatus in lieu of mechanical elements for an induction heater in particular and any inductive load in general.

In carrying out the investigation, we found the use of electric discharge apparatus in a converter system for an induction furnace or the like to be entirely feasible. However, as an outgrowth of the use of discharge devices, we encountered certain difficulties, and the present invention represents the solution of the problems to which the difficulties gave rise. In induction heating apparatus in which the power is supplied through electric discharge converting apparatus, the discharge devices which may be used are of several types. Where the current required by the load is of moderate magnitude, for example, of the order of 100 to 500 amperes, hot-cathode discharge devices of the arc-like discharge type operate satisfactorily. A hot-cathode arc-like discharge device in general comprises an anode composed of a metal such as nickel or carbon, a cathode which emits electrons when heated, a control electrode and an ionizing atmosphere provided by the vapor from a globule of mercury or by an inert gas. Where substantial current, for example of the order of several thousand amperes, is required, discharge devices of the "Ignitron" tube type are preferably used. It is to be noted that "Ignitron" tubes may with advantage also be utilized where lower currents are required and we have found them to be advantageous at currents as low as 50 amperes. The "Ignitron" tube is, in general, provided with an anode of a metal or carbon, a mercury-pool cathode and an ignition electrode which dips into the mercury-pool cathode and is composed of a highly resistant material such as silicon carbide or boron carbide. When a current is transmitted between the ignition electrode and the mercury, a discharge is initiated between the anode and the mercury. In view of the presence of the vapor from the mercury pool, the discharge device of the "Ignitron" tube type may also be regarded as an arc-like discharge device.

Of course, in addition to the electric discharge devices mentioned above, discharge devices of other types may be used. For example, where comparatively small current is required a hot-cathode high-vacuum discharge device, such as an ordinary thermionic radio tube, is satisfactory. In the substantial current range, the "Ignitron" tube may also be replaced by mercury-pool discharge devices of other types such as those in which the main discharge is ignited by drawing an arc between an electrode either within or without the container located a short distance from the mercury.

Whatever the character of the discharge device utilized, the general practice is to supply the load through at least two discharge paths, first energizing one and then the other and repeating the alternate energization periodically. In supplying the load in this manner, we have found that difficulties arise primarily by reason of backfire and premature forward-fire. Backfire discharges occur in one or the other of the discharge paths by reason of the presence of a high negative anode-cathode potential and inasmuch as at the time of the backfire, the discharge device in question should for proper operation be deenergized, the operation of the apparatus is disturbed. The discharge in this case is from the highly positive cathode operating as an anode to the highly negative anode operating as a cathode. Backfire most frequently occurs just after a discharge device has been energized and is presumably produced by a high negative anode-cathode potential which is impressed on the discharge device at the instant that it becomes deenergized. Premature forward-fire occurs some time after a discharge device has been deenergized and is apparently produced when the anode-cathode potential impressed on the discharge device after having been negative for some time becomes positive while the residual ionization in the device is still relatively high.

We have also found that considerable difficulty is encountered in starting the apparatus inasmuch as during the starting operation the discharge devices are ignited more or less at random by the ignition potentials which happen to be impressed at the time of starting. Often it happens that both of the discharge devices that should normally be alternately ignited were simultaneously ignited during starting and immediately produced the equivalent of a short circuit.

It is, accordingly, an object of our invention to provide a converting system of the type incorporating discharge paths for supplying a highly inductive load such as an induction heater in which discharges improperly timed or of improper polarity shall not occur.

Another object of our invention is to provide electric discharge apparatus for converting the supply of power from a source to a highly inductive load wherein backfire in the discharge paths shall be suppressed.

A further object of our invention is to provide electric discharge converting apparatus for supplying an inductive load wherein premature forward discharge in the discharge paths shall be suppressed.

A still further object of our invention is to provide electric discharge converting apparatus for supplying an inductive load, the operation of which shall be initiated without danger of short circuit by reason of simultaneous ignition of the discharge paths.

An additional object of our invention is to provide electric discharge converting apparatus for supplying an inductive load, the operation of which shall be initiated without the occurrence of improperly timed discharges.

An ancillary object of our invention is to provide a system for deriving load current of varying magnitude from a source in the output conductors of which constant current flows.

More specifically stated, it is an object of our invention to provide a smoothly operating converting system incorporating discharge apparatus for supplying a high frequency induction heater.

In apparatus involving our invention, a capacitor is connected in series with the load, and it is charged, discharged and recharged periodically as the load is supplied with periodic current through a plurality of discharge paths. Each of the discharge paths is normally deenergized and it is energized by the impressing of the proper control potential between its control electrode and one of its principal electrodes. First one of the discharge paths is energized and current is transmitted through the inductive load to charge the capacitor in one sense. After this, the other discharge path is energized and current of the opposite polarity is transmitted to the load discharging the capacitor and recharging it in the opposite sense. Backfire is suppressed by eliminating its principal cause, namely, the high negative potential which is impressed between the anode and the cathode of a discharge path when it is just extinguished, and before the other discharge path is energized. This is accomplished by energizing the second discharge path just as the first discharge path is about to be extinguished and before it is actually extinguished. Premature forward-fire is also suppressed by eliminating its principal cause, namely, insufficient deionization of the discharge path before positive anode-cathode potential is applied. This object is accomplished simply by prolonging the interval of time during which a negative potential of normal magnitude is applied to a discharge device which has just been extinguished. We have found that the interval may be substantially prolonged by connecting an inductor of considerable magnitude in series with the load, the capacitor associated with it and the discharge paths through which it is supplied.

The random ignition of the discharge paths at starting is eliminated by utilizing control potentials of substantial peaked wave form for energizing the discharge paths. For this purpose, the transformer through which the control potentials are supplied is provided with a saturable core and as a result the control potentials supplied are of duration short compared to a period of the current supplied to the load.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a diagrammatic view showing an embodiment of our invention;

Fig. 2 is a graph illustrating the operation of one aspect of the embodiment shown in Fig. 1;

Fig. 3 is a graph illustrating another aspect of the embodiment shown in Fig. 1;

Figure 4:
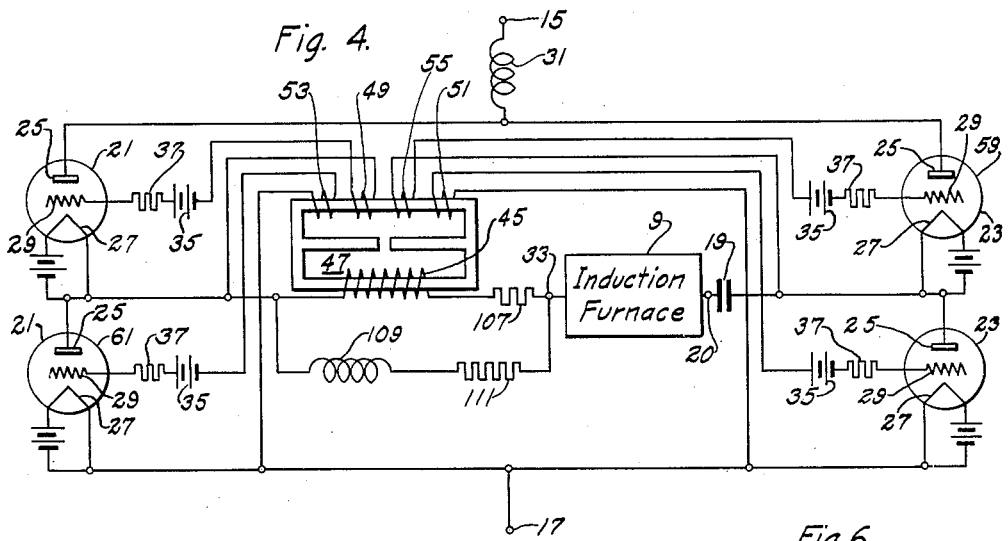
Fig. 4 is a diagrammatic view showing a modification of our invention.

The apparatus shown in Fig. 1 comprises an inductive heater 9 which may be regarded as symbolical of any general inductive load. Electrically the heater 9 may be regarded as composed of an inductor 11 and a resistor 13, as shown, and under certain circumstances the capacity of the elements of the heater to each other or to ground may be of such substantial magnitude that the heater may be regarded as having also capacity.

Power is supplied to the heater 9 through a pair of terminals 15 and 17 shown in Fig. 1 as located above and below the apparatus. The terminals may be regarded as the output connections of a suitable source. In the usual practice of our invention, power derived from a commercial 60-cycle alternating-current source is rectified and impressed on the terminals 15 and 17 shown.

A capacitor 19 of considerable magnitude is connected to one terminal 20 of the heater 9 so that it is in series with the heater. The capacitor may be charged in one sense through a pair of electric discharge paths 21 and 23. Each of the discharge paths 21 and 23 is of the arc-like discharge type and has an anode 25, a cathode 27, a control electrode 29 and a gaseous medium. The anode 25 of one discharge path 21 is connected to the upper terminal 15 of the source through a suitable smoothing reactor 31 and its cathode 27 is connected to the remaining terminal 33 of the heater 9. The anode 25 of the other discharge path 23 is connected to the capacitor 19 and its cathode to the remaining terminal 17 of the source. The reactor 31 is so large that the current which flows through it from the terminal 15 is substantially constant.

The discharge paths 21 and 23 are normally maintained deenergized by a suitable biasing potential supplied by a source 35 connected between the control electrode 29 and the cathode 27 of each discharge path through a grid resistor 37 and the secondary 39 of a suitable grid transformer 41, respectively. They may be simultaneously energized by impressing suitable positive potentials between the control electrode 29 and the cathode 27 in each case.

The energizing potentials may be derived from a suitable source of any general type, as for example a small alternator 43 of variable frequency. The alternator 43 supplies the primary 45 of a saturable transformer 47 provided with a plurality of secondary windings 49, 51, 53 and 55. One of the latter windings 49 is connected to the primary 57 of the grid transformer 41, associated with one of the discharge paths 21, while another winding 51 is connected to supply the primary 57 of another grid transformer 41 whereby potential is impressed between the control electrode 29 and the cathode 27 of the other discharge device 23 of the pair. The alternations impressed by the source 43 on the primary 45 of the saturable transformer 47 are converted into potentials of peaked wave form in the secondaries 49 to 55 of the saturable transformer and those present in windings 49 and 51 are impressed between the control electrodes 29 and the cathodes 27 of discharge paths 21 and 23 to initiate a discharge therein. The secondaries 49 and 51 of the saturable transformer 47 are so wound that the discharge paths 21 and 23 are energized simultaneously.

When the capacitor 19 in series with the heater 9 is charged in one sense, it is discharged and recharged in the opposite sense through a second pair of discharge paths 59 and 61 of the arc-like discharge type. The latter discharge paths are similar to the ones discussed above and are similarly connected. The anode 25 of one of the discharge paths 59 is connected to the upper terminal 15 through the smoothing reactor 31 while its cathode 27 is connected to the capacitor 19. The anode 25 of the other discharge path 61 is connected to the same terminal 33 of the heater 9 as the cathode 27 of the discharge path 21, while the cathode 27 of the former discharge path 61 is connected to the lower terminal 17.

The discharge paths 59 and 61 are maintained normally deenergized and are energized from the same source 43 as the first pair of discharge paths 21 and 23. To provide for energizing the discharge paths 59 and 61, the remaining secondary windings 53 and 55 of the saturable transformer 47 are used. One of the windings 53 is connected to a primary of the grid transformer 41 associated with the discharge path 61, while the other winding 55 of the transformer is similarly connected to the grid transformer 41 associated with the other discharge path 59 of the pair. The turns of the last-mentioned secondary windings 53 and 55 of the saturable transformer 47, however, are wound opposite to the corresponding turns of the secondary windings 49 and 51 associated with the first-mentioned pair of discharge paths 21 and 23. For this reason the potential supplied to the control circuits of the pair of discharge paths 59 and 61 is displaced in phase by 180° with reference to the control potential supplied to the pair of paths 21 and 23, and, therefore, the energization of the pairs of discharge paths 21 and 23 and 59 and 61 is alternate.

It is to be noted that the current flowing through the discharge paths 21, 23, 59 and 61 and through the load 9 is of continually varying magnitude while the current supplied through the reactor 31 is substantially constant. To absorb the instantaneous difference between the supply current and the load current, capacitor 97 is connected in series with an inductor 95 between the lower terminal of the reactor 31 and the source terminal 17.

In a system constructed in accordance with our invention as thus far described, the capacitor 19, inductance 11 of the load 19, together with the inductor 95 and the capacitor 97 constitute a network tuned substantially to the frequency of the source 43 whereby control potential is supplied. Accordingly, when the first-mentioned pair of discharge paths 21 and 23 is energized, current flows through the heater 9 and the capacitor 19 is charged. When the capacitor 19 has attained substantially its full charge, the current is interrupted and the first pair of discharge paths is deenergized since the potential impressed on the capacitor counteracts the potential supplied to the discharge paths by the main source. After this occurs, energizing potential is supplied to the second pair of discharge paths 59 and 61 and now current flows through the latter discharge paths to discharge the capacitor 19 and recharge it to the opposite polarity. The polarity of the current which flows through the heater 9 is now opposite to the polarity of the current which flowed when the first pair of discharge paths 21 and 23 was energized. After the capacitor has been charged to the last polarity, the second pair of discharge paths 59 and 61 are deenergized and again the first pair of discharge paths 21 and 23 are energized. The discharge paths 21 and 23 and 59 and 61 continue to be alternately energized as long as power is supplied to the system and as the capacitor 19 continuously charges, discharges and recharges alternating current of the desired frequency is supplied to the water 9.

It is to be noted that by reason of the presence of the saturable transformer 47 the energizing potentials for the discharge paths 21, 23, 59 and 61 at all times persist only for an interval of time that is short compared to a half period of the potentials applied by the alternation 43 or, what is the same thing, a half cycle of the current supplied to the load. Hence, at starting as well as during normal operation, the discharge paths can only be energized during a very short interval in each half period and accordingly when the starting equipment for the apparatus is closed the discharge paths are not energized at random as in systems in which the saturable transformer is not incorporated but at a particular instant precisely predetermined by the occurrence of the potential peaks and only at this instant. Moreover, since at one time the potential peaks applied to only one or the other of the pairs of discharge paths is positive, the simultaneous energization of all the discharge paths is out of the question. The short-circuits and other disturbances which resulted from the random ignition of the discharge paths in the prior art apparatus are thus suppressed. It is to be noted that while the saturable transformer 47 is a highly desirable element in the system, there may be occasions where it may be omitted and satisfactory operation for the commercial purpose at hand be attained by using an ordinary control supply. The use of an ordinary control supply such as an ordinary nonsaturable transformer in a system otherwise incorporating features of our invention shall not remove the system from the scope of our invention.

The operation of the apparatus as thus far described is represented by the full line curve 63 of Fig. 2. The curve 63 is a graph of the potential impressed between the anode 25 and the cathode 29 of one of the discharge paths 21, 23, 59 or 61 as a function of time, potential being plotted as ordinate and time as abscissa. Of course the curve is also applicable to the other discharge paths of the same pair. The plot is taken over one half cycle of operation, that is, while the capacitor 19 is being discharged and recharged to a potential of the opposite polarity.

At the beginning of the interval under consideration, the discharge paths for which the curve is plotted is energized and the potential impressed between its anode 25 and its cathode 27 is represented by the horizontal line 65 a short distance above the time axis 67. The distance between the line 65 and the time axis represents the arc-drop across the discharge path. The current continues to flow through the discharge path and to be represented by the horizontal line 65, until the capacitor 19 is fully charged and then the discharge path is deenergized. If the discharge paths of the other pair are not energized before the discharge paths of the pair represented by the curve are deenergized, we have found that a relatively high potential is impressed on the discharge path that has just been deenergized for the short interval of time during which both sets of discharge paths are deenergized. This condition is represented by the two vertical lines 69 and 71 interconnected by a horizontal line 73 on the left of Fig. 2. The first vertical line 69 represents a sharp increase in the negative anode-cathode potential from the arc-drop value just after the discharge path is deenergized. The second vertical line 71 represents a sharp decrease in the negative anode-cathode potential which occurs when the discharge paths of the other pair are energized. The high negative anode-cathode potential is the resultant of the potential arising from the charges on the capacitors 19 and 97 and the potential of the source.

When the discharge paths of the second pair are energized, the capacitor 19 is connected through the energized discharge paths across the deenergized paths and the potential is reduced to a moderate value. The magnitude of the potential at the beginning of the discharge and recharge period depends on the potential across the capacitor 19 and the inductive and resistive potential drops through the heater 9. The inductive potential drop depends on the rate of change of current at the beginning of the discharging interval and has a value of considerable magnitude and of polarity opposite to that of the capacitor potential. The resistive drop is initially substantially zero. The potential across the capacitor is at the beginning of the discharge, of course, the same as it was when the discharge paths were all deenergized. The net result is the value represented by the left hand end 74 of the S-shaped curve 75.

As the capacitor continues to discharge and then recharges in the opposite sense, the potential across the discharge path under consideration increases to zero and then to a substantial positive value as is shown by the lower and the upper portions 77 and 79 of the S-shaped curve 75. When the capacitor 19 is again fully charged the discharge paths that were energized become deenergized and again all four discharge paths are deenergized. Again the potential impressed across the discharge path under consideration is determined by the capacitors and the source alone and is considerable in magnitude. This time, however, it rises to a high positive value as shown by the two vertical lines 81 and 83 which are formed by the horizontal line 85. When the discharge path represented by the curve 85 is finally energized, the anode-cathode potential falls to the arc-drop value represented by the horizontal line 87 on the right.

We have found that while the impressing of a negative potential between the anode 25 and the cathode 27 of the discharge path that has just been deenergized produces a substantial deionization effect thereon, this effect may not sufficiently deionize the discharge present to prevent a premature forward-fire. This forward discharge occurs when the anode-cathode potential becomes positive during the interval represented by the positive portion 79 of curve 75. To increase the deionization, we found that the deionizing time should be increased. To accomplish this object the time during which negative anode-cathode potential impressed on a discharge path that has just been deenergized is increased; that is to say, the time duration of the left hand portion 77 of the S-shaped curve 75 is increased.

This situation is represented by the broken line curve 89. It will be noted by comparing the left-hand section 91 of the S-shaped portion 93 of curve 89 with the corresponding portion 77 of the full line curve 63 that in a system operating in accordance with the broken line curve, the negative potential on a deenergized discharge path after the discharge paths of the other pair have been energized, is somewhat larger than the corresponding negative potential of a system represented by the full line. However, the negative potential represented by the broken line curve 89 persists for a longer time than that represented by the full line curve 63, and, therefore, the discharge path has more time to become deionized.

To obtain the desirable condition represented by the broken line curve 89 in Fig. 2, we properly dimension the inductor 95 in series with the capacitor 97. The interval during which negative potential is impressed on a deenergized discharge path after the paths of the other pair have been energized depends on the magnitude of the inductor 95 and may be increased by increasing the inductor. It will be noted that when any pair of discharge paths 21 and 23 or 59 and 61 is energized, a series network is completed which extends from the lower terminal of the smoothing reactor through the upper energized discharge path 21 or 59, the heater 9 and the capacitor 19 in series therewith, the other energized discharge path 23 or 61 respectively, the auxiliary capacitor 97, the inductor 95 to the lower terminal of the reactor 31. This circuit constitutes a series circuit having inductance and capacity and, therefore, has a resonance frequency. In accordance with our invention, the inductor 95 and the two capacitors 19 and 97 are so selected that the series network is tuned to the frequency of the current that is to be supplied to the heater 9. As a general rule the auxiliary capacitor 97 is selected large with respect to the capacitor 19 associated with the heater 9, so that the potential across it which arises from oscillatory current is small. The deionization period may be increased over a considerable range by increasing the magnitude of the inductance 95 and thus conditions resulting in undesirable forward-fire may be suppressed. We have operated circuits of this character successfully.

Backfire is produced in an electric discharge device by an excessively high negative anode-cathode potential. Such a potential exists in the discharge paths 21, 23, 59 and 61 when their condition is represented by points along line 73 in Fig. 2. It follows that just after a discharge path is extinguished and before the other pair of paths are ignited a high negative potential particularly conducive to backfire is impressed on the extinguished discharge path. Manifestly the backfires produced by this high potential may be suppressed by eliminating the high potential; that is to say, by eliminating the condition which produces the vertical lines in Fig. 2. This object is accomplished by energizing the second set of discharge paths when the first set is just about to be deenergized but before it is actually deenergized. The variation of potential as a function of time under such circumstances is illustrated in Fig. 3, wherein the full line curve 99 corresponds to the full line curve 63 of Fig. 2 and the broken line curve 101 to the broken line curve 89 of Fig. 2.

To avoid superfluous discussion, we shall consider only the full line curve 99. As will be noted, initially the potential drop across the discharge path for which curve 99 is plotted is simply the arc-drop as represented by the horizontal portion 103 of curve 99. Just before the current through the energized discharge paths decreases to zero the other discharge paths are energized so that all four discharge paths are conductive simultaneously. With the proper proportioning of the reactances 11, 19, 95 and 97, however, the current in the two discharge paths in which the current was approaching zero, continues to approach zero and finally becomes extinguished while the current in the other discharge paths continues to increase. When the formerly energized discharge path is just deenergized, the potential decreases to a negative value as represented by the point 105 of the curve, but inasmuch as the previously deenergized pair of discharge paths are energized at this instant the negative value represented by the point 105 corresponds to a moderately low potential substantially equivalent to the potential represented by the point 74 in Fig. 2. The potential impressed across the deenergized discharge paths now increases to zero and to a moderate positive value as the capacitor 19 is discharged and recharged. After the capacitor has been completely recharged through the now energized discharge paths, the latter are deenergized and at the same time the discharge paths represented by the curve 99 are energized at the instant potential across the deenergized paths decreases to the arc-drop value. Inasmuch as there is no interval during which the latter discharge paths are deenergized after the just previously energized pair of discharge paths are also energized, there is no sharp increase in the anode-cathode potential such as is represented by the horizontal line 85 in Fig. 2.

In the practice of our invention as it is shown in Fig. 1, the condition represented in Fig. 3 may be most simply attained by tuning the series network consisting of the heater 19, the inductor 95 and the two capacitors 19 and 97 to a frequency that is slightly lower than the frequency of the alternator 43 or by adjusting the alternator 43 so that its frequency is slightly higher than that of the network including the load. In either case each pair of discharge paths are in their time energized just before the capacitor 19 becomes completely charged, that is to say, just before the other pair of discharge paths are completely deenergized.

In the modification shown in Fig. 4, the primary 45 of the saturable transformer 47 is connected in series with the heater 9 so that the current waves transmitted through the load are also transmitted through the primary of the transformer and produce the necessary energizing pulsations in the secondary windings 49 to 55. Each of the secondary windings 49 to 55 is in the present case connected directly between the control electrode 29 and a cathode 27 of a discharge path through the usual biasing source 55 and the energizing potential peaks are thus impressed in the control circuits of the discharge paths. The load current thus supplies the energizing potentials for the discharge paths 21, 23, 59 and 61 and the alternator 43 is not necessary.

In the apparatus shown in Fig. 4, moreover the condition illustrated in Fig. 3 is attained in a different manner than with the apparatus shown in Fig. 1 since in this case the frequency of the potential supplied to the control circuits cannot be adjusted independently of the frequency at the heater current. Here the object is accomplished by advancing the phase of the peaks, which are impressed in the control circuits to energize the discharge paths, relative to the waves representing the charging and discharging of the capacitor 19, associated with the heater 9. The phase shift in the potentials impressed by the secondary windings 49 to 55 is attained by connecting a resistor 107 between the heater 9 and the primary 45 of transformer 47 and a network consisting of a reactor 109 and a resistor 111 in parallel with the primary 45 and its associated resistor 107. The resistor 111 in series with the reactor 109 is so dimensioned that the ratio of the resistance 107 to the reactance in the circuit of the primary 45 of the saturable transformer 47 is greater than the same ratio in the circuit of the reactor 109.

Figure 5:
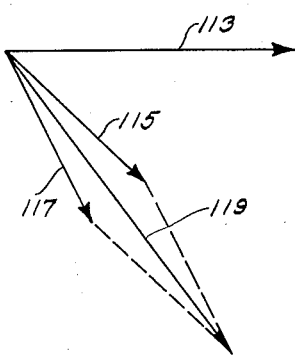
Fig. 5 is a vector diagram illustrating the operation of the apparatus shown in Fig. 4.

The condition which exists is illustrated vectorially in Fig. 5. In this view the horizontal vector 113 represents the potential impressed across the network consisting of the primary 45 of the transformer 47, the inductor 109 and the two resistors 107 and 111. The current flowing through the primary of the transformer may be represented by a second vector 115 which extends below the horizontal vector and at an acute angle to it. The current flowing through the inductor may be represented by a third vector 117 which is below the horizontal vector and at a greater angle to it than the second vector, inasmuch as the resistance-to-reactance ratio determining the angle of the latter vector 117 is larger than that determining the angle of the former vector 115. The current flow through the load is equal to the sum of the currents flowing through the primary 45 and through the inductance 109. Therefore, the load current may be represented by a vector 119 equal to the sum of the second and third vectors 115 and 117. It will be noted that the latter vector 119 lies below the second vector 117. Hence the current represented by the second vector 117, namely, the primary current of the saturable transformer 47, leads the load current by a small angle. The potential peaks produced in the secondary windings 49 to 55 of the transformer 47 occur when the primary current passes through zero. The peaks whereby the discharge paths are energized, therefore, occur in each case before the heater current is zero and, therefore, before the previously energized discharged paths are deenergized.

Figure 6:
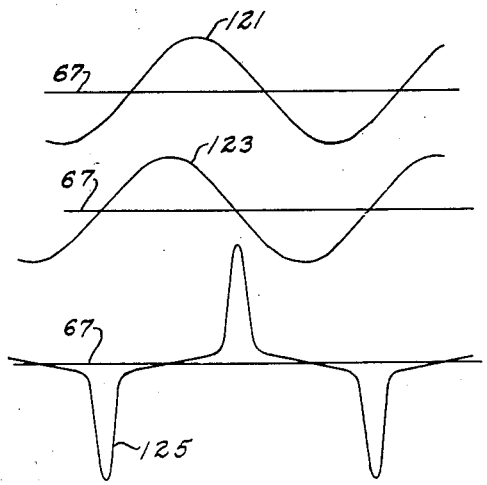
Fig. 6 is a graph illustrating the operation of the apparatus shown in Fig. 4.

For a better understanding of the operation, Fig. 6 may be considered. The upper curve 121 of Fig. 6 may be taken to represent the load current. The center curve 123 represents the current through the primary 45 of the saturable transformer 47. This current leads the load current, as has been explained with reference to Fig. 5. The potential peaks in the secondary windings 49 to 55 of the saturable transformer are produced when the primary current passes through zero and are illustrated in the lower curve 125. It will be noted that these peaks occur in every case just before the load current becomes zero and, therefore, just before the discharge paths supplying the load current are energized.

Figure 7:
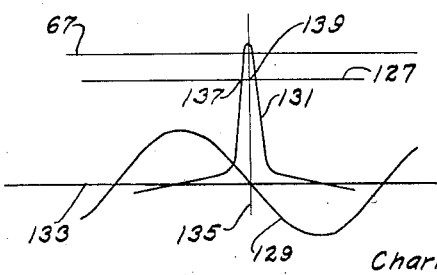
Fig. 7 is a graph illustrating the operation of a modification of Fig. 4.

Fig. 7 illustrates graphically how the same condition may be produced without the dephasing network 109—111 in situations in which the lead angle required is comparatively small. In such a case, the peaks produced by the secondary windings of the saturable transformer may have sufficient width to energize the discharge path of any pair before the other pair becomes deenergized. In Fig. 7 the upper line 127 represents the critical control potential of one of the discharge paths. If the discharge path corresponding to the line 127 is to be energized, the control potential must rise above the values represented by the curve. The lower sine curve 129 represents the current flow through the primary 45 of the saturable transformer 47 and the peak curve 131 represents the corresponding secondary potential for the discharge path represented by the upper critical potential line 127. The peak potential is superimposed, in general, on the bias potential supplied by the source 35, for example, which normally maintains the discharge device deenergized, and the latter potential is represented by the horizontal line 133 below the critical curve from which peaked potential extends. Assume that the load current is in phase with the primary current of transformer 47. In such a case the line 135 bisecting the peak curve 131 would intersect a curve representing the heater current or the current flowing through any energized discharged path at the point where the current curve passes through zero. It will be noted, however, that the peaked curve rises above the critical line 127 at a point 137 representing an instant of time slightly ahead of the point 139 where the central line is cut by the bisecting line 135. Since the heater current is in phase with the current represented by the sine curve 129, the peaked potential represented by the peaked curve 131 will rise above the critical control potential of a deenergized discharge path before the heater current becomes zero and, therefore, before the energized pair of discharge paths are deenergized.

The extent to which the energization of the deenergized discharge path leads the zero point of the heater current may be adjusted by varying the negative bias potential of the discharge devices, that is to say, by raising or lowering the lower horizontal line 133 of Fig. 7. It is to be noted that as this line is raised, the interval of time by which the energization of the deenergized discharge paths leads the zero point in the heater current is increased. By properly designing the saturable transformer leading excitation of the discharge paths up to any desired angle may be attained.

Figure 8:
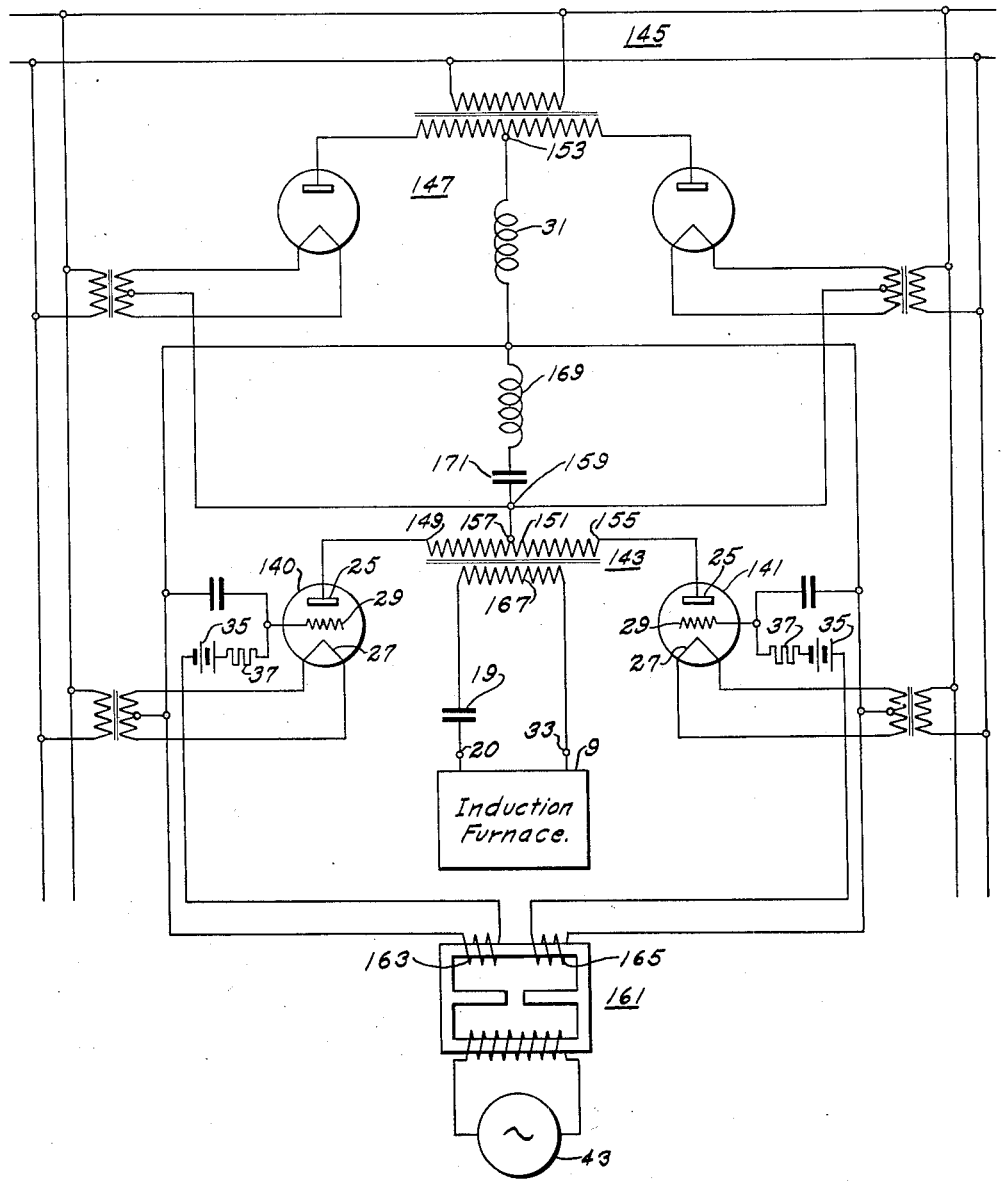
Fig. 8 is a diagrammatic view showing another modification of our invention.

In the apparatus shown in Fig. 8, two control discharge paths 140 and 141 are utilized in lieu of four. The two discharge path arrangement requires a transformer 143 between the discharge path circuit and the heater.

In the system shown in Fig. 8, power of the usual commercial frequency is supplied to the apparatus from an alternating-current line 145. The potential derived from the line is passed through a full-wave rectifier system 147 and the output of the rectifier after passing through the smoothing reactor 31 is impressed on the discharge paths 140 and 141. The latter are of the same type as utilized in the other modifications of our invention, each having the anode 25, the cathode 27 and the control electrode 29 and a gaseous medium. The anode 25 of one discharge path 140 is connected to a terminal 149 of the primary 151 of the transformer 143 whereby the discharge paths are coupled to the heater 9. Its cathode 27 is connected to the negative output terminal 153 of the rectifier system 47 through the smoothing reactor 31. The anode 25 of the other discharge path 141 is connected to the other terminal tap 155 of the primary 151 while its cathode 27 is connected through the smoothing reactor to the negative terminal of the rectifier. The mid-tap 157 of the primary 151 of the transformer 143 is connected to the positive output terminal 159 of the rectifier 147.

As in the systems shown in Figs. 1 and 4, the discharge paths 140 and 141 are supplied with energizing potential peaks from the alternator 43 through a saturable transformer 161. In the present case, however, the saturable transformer is provided with only two oppositely connected secondary windings 163 and 165, one supplying peaked potentials between the control electrode 29 and the cathode 27 of one discharge path 140, and the other similar potentials displaced in phase by 180° between the control electrode 29 and the cathode 27 of the other discharge path 141. As the discharge paths 140 and 141 are alternately energized, current flows through the portions of the primary 151 of the transformer 143 between the terminal tap 149 or 155 to which the anode 25 of the discharge path that happens to be energized is connected and the mid-tap 157 and alternating current is induced in the secondary 167 of the transformer.

The heater 9 is connected across the secondary 167 of the transformer 143 through the capacitor 19 as in the other modifications. As each discharge path 140 and 141 in its turn is deenergized and the other one energized, the capacitor 19 is discharged and recharged in the opposite sense. On becoming fully charged in any sense, the discharge path that has just been energized is deenergized and the other discharge path is at the same time energized. As in the systems shown in Figs. 1 and 4, the interval during which negative potential is impressed between the anode 25 and the cathode 27 of a deenergized discharge path is prolonged by properly dimensioning the inductor 169 in series with an auxiliary capacitor 171 between the positive and negative terminals 153 and 159 of the rectifier 147.

In effect, the inductor 169 and the auxiliary capacitor 171 are in the same series circuit as in the other modifications, namely, in series with the heater 9 and its associated capacitor 19. However, the magnitudes of the inductance 169 and the capacitor 171 depend on the side of the transformer 143 in which they are connected and varies with the square of the ratio of transformation. Thus, if the inductor 169 and the capacitor 171 are to be connected on the secondary side of the transformer 143, the value of the inductance utilized on the primary side should be divided by the square of the ratio of turns of the secondary to the primary and the capacity on the primary side should be divided by the square of the reciprocal of this ratio.

Of course, the energization of the discharge paths is timed in the same manner as in the other modifications. Each discharge path is, in turn, energized at the instant that the other discharge path is about to be deenergized. In a system such as is shown in Fig. 8, this object may be accomplished simply by adjusting the alternator 43 to a frequency somewhat greater than the frequency to which the network consisting of the heater 9, the inductor 169 and the two capacitors 19 and 171 is tuned.

In one system with which we have practiced the invention in accordance with Fig. 8, a load 9 having an inductance of 3.29 millihenries and a resistance of .5 ohm was supplied. In this case, the capacitor 19 associated with the load had a capacity of 7.5 microfarads. The transformer 143 had a primary 151 in which a potential of 440 volts was impressed between the center tap 157 and a terminal tap 149 or 155. The corresponding potential produced in the secondary 167 in each case was 906 volts. The primary of the transformer was supplied from a 250-volt direct-current source through a .064 henry smoothing reactor 31 and a resistance of .65 ohm.

For control purposes, discharge devices of the "Ignitron" tube type capable of supplying 25 kva. were utilized. The ignition electrodes of the discharge devices were supplied through hot-cathode gaseous discharge devices capable of delivering several amperes which in the trade are identified as Westinghouse KU-628 tubes. Across the source an inductor 169 having an inductance of .53 millihenries and a capacitor 171 of 220 microfarads were connected in series. It is to be noted that in calculating the natural frequency of the arrangement in accordance with the foregoing discussion, the inductance 169 and the auxiliary capacitor 171 should be referred to the secondary circuit. In the secondary circuit, the inductance of .53 millihenry is equal to an inductance of $$.53 \times \frac{(906)^2}{(440)}$$

The equivalent capacity is $$200 \times \frac{(440)^2}{(906)}$$

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. Apparatus for supplying to a load power of a predetermined frequency from a source of a given frequency comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths.

2. Apparatus for applying to a load power of a predetermined frequency from a direct current source comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths.

3. Apparatus for supplying to a load power of a predetermined frequency from a source of a given frequency comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions, said first discharge path being deenergized when said second discharge path is energized and vice versa and each said discharge path having a deionizing potential impressed thereon when first deenergized and means for prolonging the interval of time during which said deionizing potential is impressed.

4. Apparatus for supplying to a load power of a predetermined frequency from a source of a given frequency comprising charge storing means in circuit with said load, a first discharge path of the arc-like discharge type having an anode, a cathode and a control electrode, means for connecting said anode and said cathode in circuit with said source for discharging said charge storing means when it is charged in one sense and recharging it in the opposite sense, a second discharge path of the arc-like discharge type having an anode, a cathode and a control electrode, means for connecting said anode and said cathode of said second discharge path in circuit with said source for discharging said charge storing means when it is charged in the last said sense and recharging it in the first said sense, means for impressing potentials between a control electrode and a cathode of each said discharge path to energize said discharge paths successively and with a periodicity equal to said predetermined period so that they perform their charging and discharging functions, said first discharge path being deenergized when said second discharge path is energized and vice versa and each said discharge path having a negative anode-cathode potential impressed thereon when first deenergized and means for prolonging the interval during which said negative anode-cathode potential is impressed.

5. Apparatus for supplying to a load power of a predetermined frequency from a source of a given frequency comprising charge storing means in circuit with said load, a first discharge path of the arc-like discharge type having a plurality of principal electrodes and a control electrode, means for connecting said principal electrodes in circuit with said source for discharging said charge storing means through said load when it is charged in one sense and recharging it through said load in the opposite sense, a second discharge path of the arc-like discharge type having a plurality of principal electrodes and a control electrode, means for connecting the principal electrodes of said second discharge path in circuit with said source for discharging said charge storing means through said load when it is charged in the last said sense and recharging it through said load in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths.

6. Apparatus for supplying to a load power of a predetermined frequency from a source of a given frequency comprising charge storing means in circuit with said load, a first discharge path of the arc-like discharge type having an anode, a cathode and a control electrode, means for connecting said anode and said cathode in circuit with said source for discharging said charge storing means through said load when it is charged in one sense and recharging it through said load in the opposite sense, a second discharge path of the arc-like discharge type having an anode, a cathode and a control electrode, means for connecting said anode and said cathode of said second discharge path in circuit with said source for discharging said charge storing means through said load when it is charged in the last said sense and recharging it through said load in the first said sense, means for impressing potentials between a control electrode and a cathode of each said discharge path to energize said discharge paths successively and with a periodicity equal to said predetermined periods so that they perform their charging and discharging functions, said first discharge path being deenergized when said second discharge path is energized and vice versa and each said discharge path having a negative anode-cathode potential impressed thereon when first deenergized and means for prolonging the interval during which said negative anode-cathode potential is impressed.

7. Apparatus for supplying to a load having reactance power of a predetermined frequency from a source of a given frequency comprising charge storing means in series circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last sense and recharging it in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths and in effect in series with said load and said capacitor, said reactance means, the reactance of said load and said capacitor constituting a series tuned circuit tuned to said predetermined frequency.

8. Apparatus for supplying to a load power of a predetermined frequency from a source of a given frequency comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths, each of said potentials being supplied to energize one of said discharge paths while the discharge path corresponding to the other potential is still energized.

9. Apparatus for supplying power from a source to a load comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively so that they perform their charging and discharging functions and reactance means in addition to said capacitor connected in series with said discharge paths.

10. Apparatus for supplying power from a source to a load comprising charge storing means in circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively so that they perform their charging and discharging functions and reactance means in addition to said capacitor connected in series with said discharge paths, each of said potentials being supplied to energize the one of said discharge paths which is at the time deenergized while the other discharge path is still energized.

11. Apparatus for supplying, to a load having reactance, power of a predetermined frequency from a source of a given frequency comprising charge storing means in series circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions and reactance means in addition to said capacitor connected in series with said discharge paths and in effect in series with said load and said capacitor, said reactance means, the reactance of said load and said capacitor constituting a series tuned circuit tuned to a frequency slightly higher than said predetermined frequency.

12. Apparatus for supplying to a load having reactance power of a predetermined frequency from a source of a given frequency comprising charge storing means in series circuit with said load, a first discharge path of the arc-like discharge type having an anode, a cathode and a control electrode, means for connecting said anode and said cathode in circuit with said source for discharging said charge storing means when it is charged in one sense and recharging it in the opposite sense, a second discharge path of the arc-like discharge type having an anode, a cathode and a control electrode, means for connecting said anode and said cathode of said second discharge path in circuit with said source for discharging said charge storing means when it is charged in the last said sense and recharging it in the first said sense, means for impressing potentials between a control electrode and a cathode of each said discharge path to energize said discharge paths successively and with a periodicity equal to said predetermined period so that they perform their charging and discharging functions and reactance means in addition to said capacitor connected in series with said discharge paths and in effect in series with said load and said capacitor, said reactance means, the reactance of said load and said capacitor constituting a series tuned circuit tuned to said predetermined frequency.

13. Apparatus for supplying, to a load having reactance, power of a predetermined frequency from a source of a given frequency comprising charge storing means in series circuit with said load, a first discharge path of the arc-like discharge type having an anode, a cathode and a control electrode, means for connecting said anode and said cathode in circuit with said source for discharging said charge storing means when it is charged in one sense and recharging it in the opposite sense, a second discharge path of the arc-like discharge type having an anode, a cathode and a control electrode, means for connecting said anode and said cathode of said second discharge path in circuit with said source for discharging said charge storing means when it is charged in the last said sense and recharging it in the first said sense, means for impressing potentials between a control electrode and a cathode of each said discharge path to energize said discharge paths successively and with a periodicity equal to said predetermined period so that they perform their charging and discharging functions and reactance means in addition to said capacitor connected in series with said discharge paths and in effect in series with said load and said capacitor, said reactance means, the reactance of said load and said capacitor constituting a series tuned circuit tuned to a frequency slightly higher than said predetermined frequency.

14. Apparatus according to claim 12 characterized by the fact that the potentials impressed between the control electrodes and the cathodes are of short duration compared to the period of the predetermined frequency.

15. Apparatus for supplying, to a load having inductance, power of a predetermined frequency from a source of a given frequency comprising charge storing means in series circuit with said load, a first discharge path of the arc-like discharge type having a plurality of principal electrodes and a control electrode, means for connecting said principal electrodes in circuit with said source for discharging said charge storing means when it is charged in one sense and recharging it in the opposite sense, a second discharge path of the arc-like discharge type having a plurality of principal electrodes and a control electrode, means for connecting the principal electrodes of said second discharge path in circuit with said source for discharging said charge storing means when it is charged in the last said sense and recharging it in the first said sense, means for impressing potentials between a control electrode and a principal electrode of each said discharge path to energize said discharge paths successively and with a periodicity equal to said predetermined period so that they perform their charging and discharging functions, an inductance, another capacitor and means for connecting said inductance and said other capacitor in effect in series circuit with said load and said first-named capacitor and in such manner to said discharge paths that either of said discharge paths closes a network in which the said discharge path, said load, said first-named capacitor, said inductance and said other capacitor are in series, said capacitors and said inductance being so dimensioned that said network constitutes a series tuned circuit tuned substantially to said predetermined frequency.

16. Apparatus for supplying a reactance load having first and second terminals from a source having first and second terminals comprising a first discharge path of the arc-like discharge type connected between said first terminal of said source and said first terminal of said load, a second discharge path of the arc-like discharge type connected between said first terminal of said source and said second terminal of said load, a third discharge path of the arc-like discharge type connected between said second terminal of said source and said first terminal of said load, a fourth discharge path of the arc-like discharge type connected between said second terminal of said source and said second terminal of said load and reactance means connected between the terminals of said source.

17. Apparatus for supplying a reactance and resistance load having first and second terminals from a source having first and second terminals comprising a first discharge path of the arc-like discharge type having an anode, a cathode and a control electrode connected between said first terminal of said source and said first terminal of said load, a second discharge path of the arc-like discharge type having an anode, a cathode and a control electrode connected between said first terminal of said source and said second terminal of said load, a third discharge path of the arc-like discharge type having an anode, a cathode and a control electrode connected between said second terminal of said source and said first terminal of said load, a fourth discharge path of the arc-like discharge type having an anode, a cathode and a control electrode connected between said second terminal of said source and said second terminal of said load, reactance means connected between the terminals of said source and means for impressing energizing potentials alternately between the control electrode and the cathode of said first and third and said second and fourth discharge paths.

18. Apparatus according to claim 17 characterized by the fact that the energizing potentials are impressed on one set of paths while the other set is still energized.

19. Apparatus for supplying a reactance load having first and second terminals from a source having first and second terminals comprising a first discharge path of the arc-like discharge type connected between said first terminal of said source and said first terminal of said load, a second discharge path of the arc-like discharge type connected between said first terminal of said source and said second terminal of said load, a third discharge path of the arc-like discharge type connected between said second terminal of said source and said first terminal of said load, a fourth discharge path of the arc-like discharge type connected between said second terminal of said source and said second terminal of said load and means for impressing energizing potentials alternately betweeen the control electrode and the cathode of said first and third and said second and fourth discharge paths, said energized potentials being impressed on one set of said paths while the other set is still energized.

20. Apparatus for supplying a reactance load having first and second terminals from a source having first and second terminals comprising a first discharge path connected between said first terminal of said source and said first terminal of said load, a second discharge path connected between said first terminal of said source and said second terminal of said load, a third discharge path connected between said second terminal of said source and said first terminal of said load, a fourth discharge path connected between said second terminal of said source and said second terminal of said load and reactance means connected between the terminals of said source.

21. For use in supplying a load from a source of electrical energy, the combination comprising a first electric discharge valve in circuit with said source and said load permitting the transmission of a first set of pulses of current from said source to said load, a second electrical valve in circuit with said source and said load permitting the transmission of a second set of pulses of current from said source to said load, and means, to be actuated by the pulses of said first set, for initiating the flow of each of the pulses of said second set through said second valve just prior to the termination of corresponding pulses of said first set.

22. For use in supplying a load from a source of electrical energy, the combination comprising a first electric discharge valve in circuit with said source and said load permitting the transmission of a first set of pulses of current from said source to said load, a second electrical valve in circuit with said source and said load permitting the transmission of a second set of pulses of current of opposite polarity to that of said first set, from said source to said load, and means, to be actuated by the pulses of said first set, for initiating the flow of each of the pulses of said second set through said second valve just prior to the termination of corresponding pulses of said first set.

23. For use in supplying a load from a source of electrical energy, the combination comprising a first electric discharge valve in circuit with said source and said load permitting the transmission of a first set of pulses of current from said source to said load, a second electric valve in circuit with said source and said load permitting the transmission of a second set of pulses of current from said source to said load, and means, to be actuated by the pulses of said first set, for initiating the flow of each of the pulses of said second set through said second valve just prior to the termination of corresponding pulses of said first set, said initiating means comprising a transformer, the primary of which is in circuit with said load and impedance means in parallel with said primary, the ratio of the resistance to the reactance of said impedance means being less than the ratio of the resistance to the reactance of the portion of the circuit to which the impedance means is parallel.

24. For use in supplying a load from a source of electrical energy, the combination comprising a first electric discharge valve in circuit with said source and said load permitting the transmission of a first set of pulses of current from said source to said load, a second electrical valve in circuit with said source and said load permitting the transmission of a second set of pulses of current from said source to said load, and means, to be actuated by the pulses of said first set, for initiating at flow of each of the pulses of said second set through said second valve just prior to the termination of corresponding pulses of said first set, said initiating means comprising a saturable transformer, the primary of which is in circuit with said load and impedance means in parallel with said primary, the ratio of the resistance to the reactance of said impedance means being less than the ratio of the resistance to the reactance of the portion of the circuit to which the impedance means is parallel.

25. For use in supplying a load from a source of electrical energy, the combination comprising a first electric discharge valve in circuit with said source and said load permitting the transmission of a first set of pulses of current from said source to said load, a second electrical valve in circuit with said source and said load permitting the transmission of a second set of pulses of current from said source to said load, and means, to be actuated by the pulses of said first set, for initiating the flow of each of the pulses of said second set through said second valve just prior to the termination of corresponding pulses of said first set, and initiating means comprising a transformer, and a resistor, the primary of said transformer and said resistor being in circuit with said load and impedance means bridging said primary and said resistor, the ratio of the resistance to the reactance of said impedance means being less than the ratio of the resistance to the reactance of the portion of the system bridged by said impedance.

26. For use in supplying a load from a source of electrical energy, the combination comprising means permitting the transmission of a first set of pulses of current from said source to said load, an electric valve in circuit with said source and said load permitting the transmission of a second set of pulses of current from said source to said load and means, to be actuated by the pulses of said first set, for initiating the flow of each of the pulses of said second set through said valve just prior to the termination of corresponding pulses of said first set.

27. For use in supplying a load from a source of electrical energy, the combination comprising a first electric discharge valve in circuit with said source and said load permitting the transmission of a first set of pulses of current from said source to said load, a second electric discharge valve in circuit with said source and said load permitting the transmission of a second set of pulses of current from said source to said load, and means to be actuated by the pulses of said first set, for initiating the flow of each of the pulses of said second set through said second valve just prior to the termination of corresponding pulses of said first set, said initiating means comprising a transformer, and a resistor, the primary of said transformer and said resistor being in series with said source and said load, and a network comprising a resistance and an inductive reactance bridging said primary and said resistor, the ratio of the resistance to the reactance of said network being less than the ratio of the resistance to the reactance of the portion of the system bridged by said network.

28. Apparatus according to claim 26, characterized by the fact that the valve is rendered capable of transmitting current pulses by impressing a potential impulse thereon and the initiating means includes means for impressing on said valve, in correspondence with the pulses of the second set, potential impulses of wave front substantially more steep than a sinusoidal wave front of the same amplitude as said potential impulse and of the same frequency as said pulses, the potential impulse corresponding to a particular pulse of the second set rising above the critical potential of said valve just prior to the termination of the corresponding pulse of the first set.

29. Apparatus according to claim 26, characterized by the fact that the valve is rendered capable of transmitting current pulses by impressing a potential impulse thereon and the initiating means includes a saturable transformer connected to impress potential impulses on said valve in correspondence with the pulses of the first set, said transformer being of such structure that each impulse rises to a magnitude above the critical potential of said valve just prior to the termination of the corresponding pulse of the second set.

CHARLES F. WAGNER.
JOSEPH SLEPIAN.
LEON R. LUDWIG.